United States Patent [19]

Yamamoto et al.

[11] 4,228,264
[45] Oct. 14, 1980

[54] SUSPENSION POLYMERIZATION OF VINYL CHLORIDE USING HYDROXYACRYLIC POLYMERS

[75] Inventors: Akira Yamamoto; Masaru Iida; Satoru Miyake; Hideo Yamaura; Takeshi Inoue, all of Ichihara, Japan

[73] Assignee: Nissan Chemical Industries, Limited, Tokyo, Japan

[21] Appl. No.: 890,488

[22] Filed: Mar. 27, 1978

Related U.S. Application Data

[63] Continuation of Ser. No. 732,537, Oct. 14, 1976, abandoned.

[30] Foreign Application Priority Data

Oct. 28, 1975 [JP] Japan ................................ 50-129745

[51] Int. Cl.$^2$ ........................... C08F 2/20; C08F 14/06
[52] U.S. Cl. ..................................... 526/200; 526/201; 526/202; 526/203; 526/344.2; 526/909; 526/910
[58] Field of Search ................ 526/200, 201, 202, 203

[56] References Cited

U.S. PATENT DOCUMENTS

| | | | |
|---|---|---|---|
| 3,444,270 | 5/1969 | Aliberti | 526/202 |
| 3,592,800 | 7/1971 | Oschmann | 526/202 |
| 3,620,988 | 11/1971 | Cohen | 526/202 |

FOREIGN PATENT DOCUMENTS 531078 12/1940 United Kingdom ..................... 526/201

*Primary Examiner*—C. A. Henderson
*Attorney, Agent, or Firm*—Oblon, Fisher, Spivak, McClelland & Maier

[57] ABSTRACT

A method of suspension polymerization is carried out by dispersing vinyl chloride in an aqueous medium in the presence of an oil soluble catalyst for polymerization and a polymerization improver having units

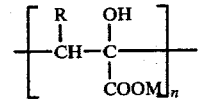

wherein M represents hydrogen atom or an alkali metal; R represents —H, —CH$_3$, —C$_2$H$_5$, —C$_3$H$_7$ or —C$_4$H$_9$ and n represents an integer of 10 to 1500.

6 Claims, No Drawings

SUSPENSION POLYMERIZATION OF VINYL CHLORIDE USING HYDROXYACRYLIC POLYMERS

This is a continuation of application Ser. No. 732,537, filed Oct. 14, 1976 now abandoned.

BACKGROUND OF THE INVENTION

The present invention relates to a method of suspension polymerization of vinyl chloride.

It has been known to polymerize vinyl chloride by a suspension polymerization by dispersing vinyl chloride in an aqueous medium in the presence of an oil soluble catalyst for polymerization.

It has been also known to use a suspending agent for dispersing vinyl chloride monomer in an aqueous medium as suitable size of particles in the suspension polymerization.

However, in the conventional suspension polymerization using one or more conventional suspending agents, it has been hard to obtain resins having desired powdery characteristics such as bulk density, particle distribution, plasticizer absorption velocity and gelation velocity and quality characteristics such as fish-eye, heat stability, etc.

In order to overcome the difficulties, a method of adding a suspending agent during the polymerization has been proposed as Japanese Unexamined Patent Publication No. 82190/1975 and a method of combining a surfactant and a polyvalent metal salt has been proposed as Japanese Patent Publication No. 6347/1975. However, these methods are not sufficient to overcome the difficulties.

SUMMARY OF THE INVENTION

It is an object of the present invention to provide a method of suspension polymerization of vinyl chloride to produce a resin having desired powdery characteristics such as bulk density, particle distribution, plasticizer absorption velocity and gelation velocity and quality characteristics such as fish-eye, heat stability, etc.

The object of the present invention has been attained by providing a method of suspension polymerization of vinyl chloride in an aqueous medium by using a polymerization improver having units

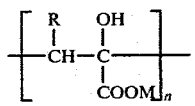

(I)

wherein M represents hydrogen atom or an alkali metal; R represents —H, —CH$_3$, —C$_2$H$_5$, —C$_3$H$_7$, or —C$_4$H$_9$ and n represents an integer of 10 to 1500, and a suspending agent.

DETAILED DESCRIPTION OF THE PREFERRED EMBODIMENTS

The polymerization improver (I) is usually used together with the conventional suspending agent such as cellulose ethers e.g. methyl cellulose, ethyl cellulose, hydroxyethyl cellulose, hydroxypropyl cellulose, hydroxypropylmethyl cellulose, carboxy methyl cellulose, and the other water soluble polymers e.g. polyvinyl alcohol, partially hydrolyzed polyvinyl acetate, styrene-maleic anhydride copolymer, vinyl acetate-maleic anhydride copolymer, partially hydrolyzed polyacrylic acid esters or polymethacrylic acid esters, gelatin, starch.

An amount of the polymerization improver is in a range of 0.00005 to 0.1 wt. part per 100 wt. parts of total monomer and is in a range of 0.05 to 100 wt. parts per 100 wt. parts of the suspending agent.

The oil soluble catalysts for polymerization which are used in the invention, can be organic peroxides such as benzoyl peroxide, caproyl peroxide, 2,4-dichlorobenzoyl peroxide, diisopropyl peroxy dicarbonate, di-2-ethylhexyl peroxy dicarbonate, dicyclohexyl peroxy dicarbonate, t-butyl peroxy pivalate, acetylcyclohexylsulfonyl peroxide, and azo compounds such as α,α'-azobisisobutyronitrile, α,α'-azobis-2,4-dimethyl valeronitrile, etc.

In the conventional method, when vinyl chloride monomer is polymerized in an aqueous medium, the vinyl chloride is partially dehydrochlorinated which decreases the pH of the aqueous medium. However, in accordance with the method of suspension polymerization of the invention, the decrease of pH can be effectively prevented.

Usually, vinyl chloride can be stably maintained under weak acidic condition and accordingly, the pH of an aqueous medium is about 7 to 5 at the time when the charging operation is finished prior to the initiation of the suspension polymerization.

When the suspension polymerization is performed, the pH of the aqueous medium is decreased to 4 to 2 after the polymerization reaction.

Accordingly, it has been proposed to add an inorganic compound such as calcium carbonate, sodium bicarbonate, various sodium phosphates, sodium acetates or an organic monomer as a buffer agent.

In order to impart the effect for preventing the decrease of pH, it is necessary to add a large amount of said inorganic or organic compound.

On the other hand, when a large amount of said inorganic or organic compound is added, the volume resistivity is decreased and solvent whiteness is caused by water absorption to deteriorate the quality of the resulting polymer.

Recently, large size of apparatus for producing vinyl chloride resin has been used whereby the glass lining tank has been replaced to the stainless steel tank.

On the other hand, toxicity of unreacted monomer in the vinyl chloride resin has been seriously considered, whereby the polymer in the form of slurry or wet cake has been directly heated.

When pH of the aqueous medium is low in said case, the corrosion of the apparatus is accelerated to cause serious trouble in the maintenance of the apparatus. The method of the suspension polymerization of the invention imparts effective result against the corrosion of the apparatus.

The polymerization improver having the units

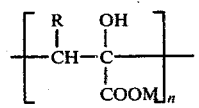

(I)

which are used in the polymerization can be polymers of
2-hydroxyacrylic acid, 2-hydroxy-3-methyl acrylic acid,
2-hydroxy-3-ethyl acrylic acid,
2-hydroxy-3-propyl acrylic acid,
2-hydroxy-3-butyl acrylic acid, or salt thereof.

It is preferable to use sodium or potassium salt so as to maintain pH in the desired range.

In the method of suspension polymerization of the invention, it is possible to add a nonionic surfactant such as fatty acid esters of polyhydric alcohol, polypropyleneglycol/ethyleneoxide adduct, or an anionic surfactant such as alkylbenzenesulfonates, fatty alcohol sulfates and the like.

It is also possible to add polymerization modifier such as trichloroethylene, carbon tetrachloride, aliphatic aldehyde, mercaptan, etc., depending upon grade of polyvinyl chloride.

The suspension polymerization of the invention can be applied not only to the homopolymerization of vinyl chloride but also the copolymerization of vinyl chloride and a comonomer.

The comonomers can be α-olefins such as ethylene, propylene; vinyl esters such as vinyl acetate, vinyl stearate; vinyl ethers such as methyl vinyl ether, cetyl vinyl ether; acrylic acid, methacrylic acid or esters thereof, vinyl halides such as vinyl bromide, vinyl fluoride except vinyl chloride; aromatic vinyl compounds such as styrene, α-methyl styrene, maleic acid or maleic anhydride, fumaric acid and esters thereof, vinylidene chloride, acrylonitrile, etc.

The comonomer can be used at a ratio of less than 50 wt. parts per 100 wt. parts of vinyl chloride.

The invention will be further illustrated by examples wherein the terms of "part" designates "part by weight", and the physical values were measured by the following methods using the following compositions.

(1) Average polymerization degree:
  Japanese Industrial Standard K-6721
(2) Bulk density:
  Japanese Industrial Standard K-6721
(3) Particle size distribution:
  Japanese Industrial Standard Z-8801
(4) Fish-eye:
  Numbers of uneven spots A 100 wt. parts of polyvinyl chloride, 50 wt. parts of dioctyl phthalate, 1 wt. part of dibuty-tin-maleate, 1 wt. part of cetyl alcohol, 0.25 wt. part of titanium white and 0.1 wt. part of carbon black were blended on a roll-mill at 150° C. for 7 minutes and the mixture was used to form a sheet having a thickness of 0.2 mm and the light was passed through the sheet to observe number of fish-eyes in 100 cm$^2$.

(5) Dry-blending time: (minutes)

A 100 wt. parts of polyvinyl chloride and 50 wt. parts of dioctyl phthalate were blended in a beaker at room temperature for 3 minutes. The mixture was charged in a small mixer kept at 90° C. and was mixed.

At each 30 seconds, a part of the mixture was sampled and was wrapped with a cigarette paper. The time when no dioctyl phthalate was bleeded, is given as the dry blend time.

(6) Gelation speed: (minutes)

A 100 wt. parts of polyvinyl chloride, 2.5 wt. parts of tribasic lead sulphate, 0.7 wt. part of barium stearate and 0.5 wt. part of stearic acid were blended. A 65 g of the mixture was charged is Brabender-plastometer equipped with a roller type mixing head and was stirred in 40 rpm at 180° C. to measure the time for reaching the maximum torque.

(7) Volume resistivity:

The mixture of (6) was blended by a roll-mill and was press-molded and it was measured by Japanese Industrial Standard K-6723.

(8) Thermal stability: (minutes)

The following components were blended on a roll-mill at the surface temperature of 170° C. for 5 minutes to form a sheet having a thickness of 0.5 mm and the sheet was hung in a geer oven at the inner temperature of 200° C.

The thermal stability was evaluated by the time for thermal decomposition of the sheet to become black.

| Polyvinyl chloride | 100 wt. parts |
|---|---|
| Calcium stearate | 1.5 wt. parts |
| Zinc stearate | 0.5 wt. part |
| Epoxidized soy bean oil | 6.0 wt. parts |

EXAMPLE 1

In 2000 liters reactor made of stainless steel, 1000 liters of water, 400 g of diisopropyl peroxydicarbonate (diluted with toluene to 70%), 500 kg of vinyl chloride monomer and the suspending agent and the polymerization improver shown in Table 1 were charged to polymerize vinyl chloride at 58° C. for 8 hours. The pH of the aqueous medium in the reactor was measured before and after the suspension polymerization and various characteristics of the polymer were also measured after drying it. The results are shown in Table 4.

EXAMPLE 2

In 2000 liters reactor made of stainless steel, 1000 liters of water, 400 g of diisopropyl peroxydicarbonate(-diluted with toluene to 70%), 500 kg of vinyl chloride monomer and the suspending agent and the polymerization improver shown in Table 2 were charged to polymerize vinyl chloride at 58° C. for 8 hours. The results are shown in Table 4.

REFERENCE 1

In accordance with the process of Examples 1 and 2, 1000 liters of water, 400 g of diisopropyl peroxydicarbonate (diluted with toluene to 70%), 500 kg of vinyl chloride monomer and the suspending agent and the polymerization improver shown in Table 3 were charged to polymerize vinyl chloride at 58° C. for 8 hours. The results are shown in Table 4. In accordance with the suspension polymerization of the invention, the decrease of pH of the aqueous medium in the reactor after the polymerization was prevented whereby the corrosion of the reactor made of stainless steel can be prevented even though the further heat-treatment was carried out. It was confirmed that the resulting polymers had high bulk density, sharp particle size distribution, less fish-eyes, and excellent dry-blending property, gelation speed, volume resistivity and thermal stability.

TABLE 1

| Experiment No. | 1 | 2 | 3 | 4 |
|---|---|---|---|---|
| Suspending agent type | PVA + Me-cell | PVA + Me-cell | PVA + Me-cell | PVA + Me-cell |

TABLE 1-continued

| Experiment No. | 1 | 2 | 3 | 4 |
|---|---|---|---|---|
| amount (g) | 400 + 100 | 400 + 100 | 400 + 100 | 400 + 100 |
| Polymerization improver | | | | |
| type | A | B | C | D |
| amount (g) | 150 | 0.5 | 4 | 50 |

TABLE 2

| Experiment No. | 5 | 6 | 7 |
|---|---|---|---|
| Suspending agent | | | |
| type | PVA | Me-cell + HEC | PVA + HEC |
| amount (g) | 500 | 250 + 250 | 250 + 250 |
| Polymerization improver | | | |
| type | A | A | A |
| amount (g) | 50 | 50 | 50 |

TABLE 3

| Experiment No. | 8 | 9 | 10 | 11 | 12 | 13 |
|---|---|---|---|---|---|---|
| Suspending agent | | | | | | |
| type | PVA + Me-cell | PVA + Me-cell | PVA + Me-cell | PVA + Me-cell | PVA + Me-cell | PVA + Me-cell |
| amount (g) | 400 + 100 | 400 + 100 | 400 + 100 | 400 + 100 | 400 + 100 | 400 + 100 |
| Polymerization improver | | | | | | |
| type | — | $Na_3PO_4$ | $Na_5P_3O_{10}$ | $Na_4P_2O_7$ | $NaHCO_3$ | $NaHCO_3$ |
| amount (g) | — | 50 | 50 | 50 | 50 | 150 |

Suspending agent:
PVA: partially hydrolyzed polyvinyl acetate (hydrolysis of 81%)
Me-cell: hydroxypropylmethyl cellulose (viscosity of 2% aqueous solution at 20° C.: 50 cps hydroxypropyl group content: 9%)
HEC: hydroxyethyl cellulose (viscosity of 2% aqueous solution at 20° C.: 300 cps)

Polymerization improver:
A: Potassium poly(2-hydroxy-3-propylacrylate)  n = 1,500
B: Sodium poly(2-hydroxy-3-propylacrylate)  n = 500
C: Potassium poly(2-hydroxy-3-ethylacrylate)  n = 1,000
D: Sodium poly(2-hydroxyacrylate)  n = 200

What is claimed is:

1. A method of suspension polymerization of vinyl chloride or vinyl chloride with a comonomer, which comprises: polymerizing said vinyl chloride or vinyl chloride with a comonomer in an aqueous medium in the presence of a combination of a polymerization improver having units of the formula:

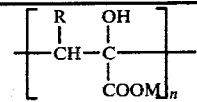

(I)

wherein
M represents an alkali metal;
R represents hydrogen, methyl, ethyl, propyl or butyl and
n represents an integer of 10 to 1500, and a suspending agent selected from the group consisting of methyl cellulose, ethyl cellulose, hydroxyethyl cellulose, hydroxypropyl cellulose, hydroxypropylmethyl cellulose, carboxymethyl cellulose, polyvinyl alcohol, partially hydrolyzed polyvinyl

TABLE 4

| | Example | | | | | | | Reference | | | | | |
|---|---|---|---|---|---|---|---|---|---|---|---|---|---|
| Experiment No. | 1 | 2 | 3 | 4 | 5 | 6 | 7 | 8 | 9 | 10 | 11 | 12 | 13 |
| pH before polymerization | 9.6 | 7.6 | 8.1 | 8.8 | 8.3 | 8.6 | 8.2 | 7.2 | 10.5 | 9.4 | 9.3 | 8.6 | 9.3 |
| pH after polymerization | 8.9 | 6.0 | 6.2 | 6.8 | 6.4 | 6.7 | 6.3 | 3.6 | 3.9 | 3.8 | 3.8 | 4.5 | 6.0 |
| Average polymerization degree P | 1030 | 1030 | 1020 | 1040 | 1040 | 1030 | 1010 | 1010 | 1020 | 1010 | 1050 | 1030 | 1030 |
| Bulk density gravity g/cc | 0.534 | 0.520 | 0.525 | 0.528 | 0.513 | 0.521 | 0.517 | 0.481 | 0.508 | 0.487 | 0.499 | 0.503 | 0.507 |
| Particle size distribution (%) | | | | | | | | | | | | | |
| 60 mesh | 100 | 100 | 100 | 100 | 100 | 100 | 100 | 98.2 | 98.6 | 99.1 | 100 | 100 | 100 |
| 100 mesh | 65.6 | 77.2 | 63.4 | 68.7 | 61.2 | 60.1 | 60.9 | 47.3 | 56.5 | 49.2 | 53.3 | 50.9 | 51.4 |
| 200 mesh | 4.8 | 4.4 | 4.8 | 2.4 | 7.8 | 6.4 | 6.9 | 12.3 | 9.7 | 8.6 | 9.3 | 8.3 | 7.3 |
| Fish eye (number) | 6 | 8 | 8 | 9 | 7 | 8 | 6 | 12 | 19 | 24 | 16 | 13 | 20 |
| Dry blend time (min.) | 3.5 | 3.0 | 3.5 | 4.0 | 4.0 | 3.0 | 3.5 | 5.5 | 5.0 | 5.0 | 5.5 | 5.5 | 5.5 |
| Gelation time (min.) | 5.2 | 6.1 | 5.6 | 5.8 | 6.8 | 6.5 | 6.4 | 8.5 | 7.1 | 7.5 | 7.8 | 8.2 | 7.8 |
| Volume resistivity ($\Omega$ - cm.) | $1.7 \times 10^{13}$ | $9.1 \times 10^{12}$ | $9.6 \times 10^{12}$ | $1.5 \times 10^{13}$ | $9.3 \times 10^{12}$ | $8.7 \times 10^{12}$ | $8.2 \times 10^{12}$ | $1.8 \times 10^{13}$ | $4.8 \times 10^{12}$ | $8.7 \times 10^{12}$ | $4.2 \times 10^{12}$ | $3.9 \times 10^{12}$ | $1.2 \times 10^{12}$ |
| Thermal stability (min.) | 80 | 70 | 70 | 80 | 80 | 70 | 70 | 50 | 60 | 60 | 70 | 60 | 60 | acetate, styrene-maleic anhydride copolymer, vinyl acetate-maleic anhydride copolymer, partially hydrolyzed polyacrylic acid ester, polymethacrylic acid ester, gelatin, and starch, the amount of said polymerization improver ranging from 0.00005 to 0.1 parts by wt. per 100 parts by wt. of total monomer and from 0.05 to 100 parts by wt. per 100 parts by wt. of the suspending agent.

2. The method according to claim 1, wherein the polymerization improver is selected from the group consisting of alkali meal salts of poly-2-hydroxyacrylic acid, poly-2-hydroxy-3-methylacrylic acid, poly-2-hydroxy-3-ethylacrylic acid, poly-2-hydroxy-3-propylacrylic acid and poly-2-hydroxy-3-butylacrylic acid.

3. The method according to claim 1, wherein said comonomer is an α-olefin, a vinyl ester, a vinyl ether, acrylic acid, methacrylic acid or esters thereof, a vinyl halide, an aromatic vinyl compound, maleic acid, maleic anhydride, fumaric acid or an ester thereof, vinylidene chloride or acrylonitrile.

4. The method of claim 3, wherein said α-olefin is ethylene or propylene; said vinyl ester is vinyl acetate or vinyl stearate; said vinyl ether is methyl vinyl ether or cetyl vinyl ether; said vinyl halide is vinyl bromide or vinyl fluoride and said aromatic vinyl compound is styrene or α-methyl styrene.

5. The method according to claim 1 wherein the suspension polymerization is performed while maintaining pH in a range of 10 to 5.

6. The method according to claim 1 wherein less than 50 wt. parts of comonomer is added to 100 wt. parts of vinyl chloride.

* * * * *